(No Model.)
H. C. HERRON.
PORTABLE ROOF.
No. 284,846. Patented Sept. 11, 1883.
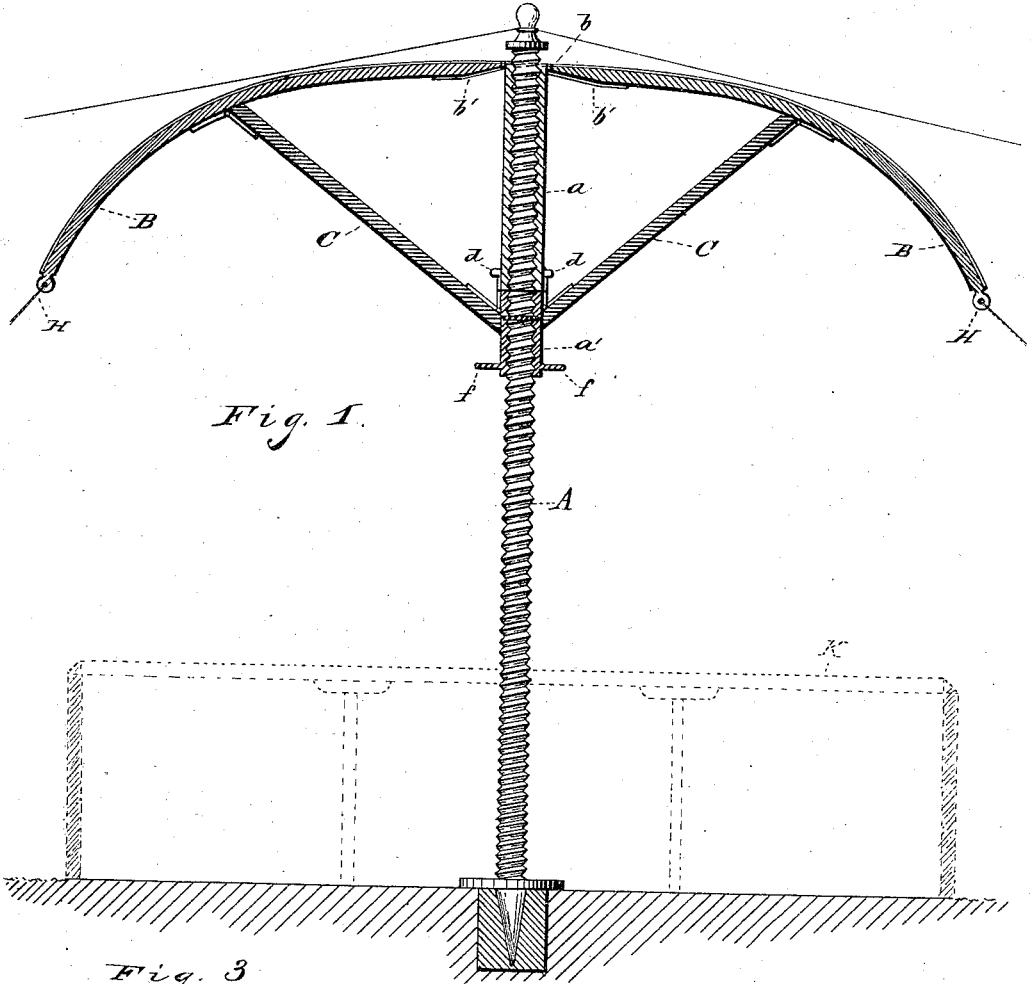
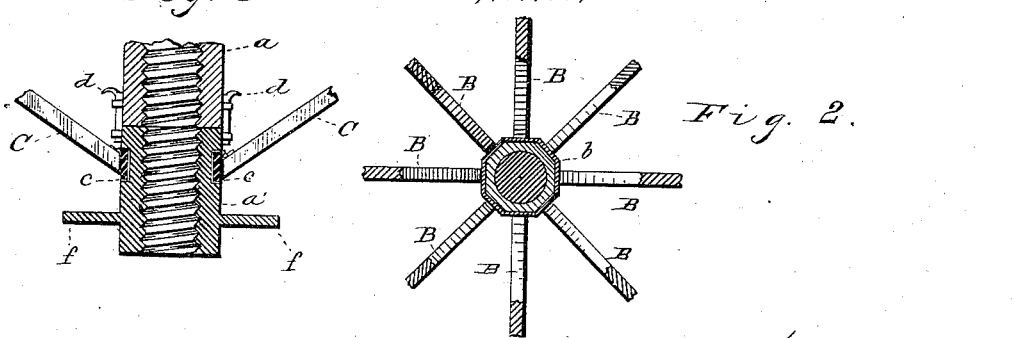
WITNESSES
H. J. Engel
E. A. Corer
Hiram C. Herron
INVENTOR
By Leggett & Leggett
ATTORNEYS

UNITED STATES PATENT OFFICE.

HIRAM C. HERRON, OF CLEVELAND, OHIO.

PORTABLE ROOF.

SPECIFICATION forming part of Letters Patent No. 284,846, dated September 11, 1883.

Application filed February 21, 1883. (No model.)

*To all whom it may concern:*

Be it known that I, HIRAM C. HERRON, of Cleveland, in the county of Cuyahoga and State of Ohio, have invented certain new and useful Improvements in Portable Roofs; and I do hereby declare the following to be a full, clear, and exact description of the invention, such as will enable others skilled in the art to which it pertains to make and use the same.

My invention relates to improvements in portable roofs; and it consists in certain features of construction and combination of parts hereinafter described, and pointed out in the claims.

The object of my invention is to provide a portable roof that can be made so as to shut up like an umbrella and be stored away in small space when not in use, and that will be in convenient form to protect stacks of hay or grain while they are being constructed.

In the drawings, Figure 1 is a front elevation, with a portion of the device in section. Fig. 2 shows the manner of attaching the ribs by means of hinges to the top of the nut or casing of the screw. Fig. 3 shows the lower nut and the manner of attaching the braces to it, and also the manner of securing the two nuts when it is desired to operate them together.

A represents a post or shaft, of any desired size or length, that may be held upright by attachments at the bottom or by guys at the top. The post is provided with a coarse thread from the top downward as far as desired, and engaging the nuts $a$ and $a'$.

To the top of the nut $a$ are attached the ribs B, and to the nut $a'$ are attached the braces C. These ribs are the supports for a cover, and they may be made of any desired material. The ribs are secured to the said nut by means of the band $b$, that is securely attached to the top of the nut $a$, and is provided with the hinges $b'$, that are also secured to the ribs B, the band being more clearly shown in Fig. 2.

The braces C may be provided with hinges at both ends, and attached at the outer ends by means of one set of said hinges to the ribs and by the hinges at the inner ends to the band $c$. This band $c$ is fitted to a groove in the nut $a'$, so that the nut may revolve without turning the said band and attached ribs.

The handles $f$, attached to the nut $a'$, and for turning the nut and the bolts $d$, are for securing the two nuts so that they will turn together.

The operation of my device is as follows: The device is opened or shut by screwing up or down on the nut $a'$, and by means of the said nut operating on the attached braces. When the ribs are distended to their full capacity, the nut $a'$ will be against the nut $a$, and by means of the bolts $d$ the two nuts are attached so as to turn together, as aforesaid; and by means of cords or equivalents attached to the ends of one or more ribs, as at H, the entire frame-work, with the covering or roof attached and distended to its full capacity, may be raised or lowered at pleasure. The said roof may be run up the post A until it is out of the way during the time that work is performed on the stack, and at night or during a sudden storm the roof may be lowered onto the stack and fully protect it from the storm.

A fence, as shown at K, or any inclosure desired, may be made around the stack, and the roof, after the removal of the stack, may be lowered upon the said inclosure, forming a shelter for stock; also, during the summer season, the roof may be available for drying different products—such, for instance, as fruits or tobacco.

Wires, cords, shelves, or other suitable supports may be attached to the ribs, and the roof, with its attached load, may be raised high in the air to facilitate the drying process, and may be lowered at night for security or for changing the load. Various other uses for this device will readily be suggested to the mind of an intelligent farmer.

In my invention the essential feature is a portable roof supported by a single central post, by means of which the roof may be raised or lowered at pleasure. Other means of raising or lowering the roof may be employed; but I prefer the screw as heretofore described as being cheap and durable.

What I claim is—

1. A portable roof supported upon a screw-threaded post by means of nuts adapted to be turned upon the thread of said post to raise or lower the roof, substantially as set forth.

2. In a portable roof, the combination, with the nut $a$, of the nut $a'$ and the bolts $d$, substantially as and for the purpose shown and described.

3. In a portable roof, the combination, with the nut $a$, of the band $b$, supporting the hinges for attaching the ribs, substantially as described, and for the purpose set forth.

4. In a portable roof, the combination, with a nut, $a'$, provided with a groove, of the band $c$, operating in the said groove and supporting the hinges, whereby the braces are attached, substantially as shown and described.

In testimony whereof I sign this specification, in the presence of two witnesses, this 8th day of February, 1883.

HIRAM C. HERRON.

Witnesses:
  JNO. CROWELL, Jr.,
  C. H. DORER.